(12) United States Patent
Hayashi

(10) Patent No.: US 10,179,562 B2
(45) Date of Patent: Jan. 15, 2019

(54) BUCKLE APPARATUS

(71) Applicant: KABUSHIKI KAISHA TOKAI-RIKA-DENKI-SEISAKUSHO, Aichi-ken (JP)

(72) Inventor: Koji Hayashi, Aichi-ken (JP)

(73) Assignee: KABUSHIKI KAISHA TOKAI-RIKA-DENKI-SEISAKUSHO, Aichi-ken (JP)

(*) Notice: Subject to any disclaimer, the term of this patent is extended or adjusted under 35 U.S.C. 154(b) by 56 days.

(21) Appl. No.: 15/388,581

(22) Filed: Dec. 22, 2016

(65) Prior Publication Data

US 2017/0225647 A1 Aug. 10, 2017

(30) Foreign Application Priority Data

Feb. 10, 2016 (JP) .................................. 2016-023930

(51) Int. Cl.
| | |
|---|---|
| *B60R 22/18* | (2006.01) |
| *B60R 22/26* | (2006.01) |
| *B60R 22/20* | (2006.01) |

(52) U.S. Cl.
CPC ............ *B60R 22/201* (2013.01); *B60R 22/18* (2013.01); *B60R 22/26* (2013.01); *B60R 2022/1806* (2013.01)

(58) Field of Classification Search
CPC ... B60R 22/18; B60R 22/195; B60R 22/1952; B60R 22/201; B60R 22/26; B60R 2022/1806; B60R 2022/208
See application file for complete search history.

(56) References Cited

U.S. PATENT DOCUMENTS

| | | | | |
|---|---|---|---|---|
| 6,485,058 | B1* | 11/2002 | Kohlndorfer | B60R 22/03 280/801.1 |
| 6,517,157 | B1* | 2/2003 | Vorac | B60N 2/0232 297/344.13 |
| 7,178,835 | B2* | 2/2007 | Hippel | B60R 22/03 280/806 |
| 8,777,268 | B2* | 7/2014 | Holbein | B60R 22/03 280/805 |
| 9,849,859 | B2* | 12/2017 | Hayashi | B60R 22/20 |
| 2004/0232670 | A1* | 11/2004 | Devereaux | B60R 22/18 280/735 |

(Continued)

FOREIGN PATENT DOCUMENTS

| | | |
|---|---|---|
| JP | 03-121219 A | 12/1991 |
| JP | 06-015541 B2 | 1/1994 |

(Continued)

*Primary Examiner* — Barry Gooden, Jr.
(74) *Attorney, Agent, or Firm* — Roberts Mlotkowski Safran Cole & Calderon P.C.

(57) ABSTRACT

A buckle apparatus includes a buckle, a moving member, a sliding member and a guide member. A tongue of a seatbelt apparatus can be engaged with the buckle. By being moved, the moving member moves the buckle. The sliding member is provided at the moving member and moves together with the moving member. The guide member allows the sliding member to slide in accordance with movement of the moving member and guides the sliding member. Friction between the guide member and the sliding member is less than friction between the guide member and the moving member.

8 Claims, 6 Drawing Sheets

(56) References Cited

U.S. PATENT DOCUMENTS

| | | | | |
|---|---|---|---|---|
| 2006/0076767 A1* | 4/2006 | Hippel | .................... | B60R 22/03 |
| | | | | 280/806 |
| 2006/0249946 A1* | 11/2006 | Bachmann | .......... | B60R 22/1953 |
| | | | | 280/806 |
| 2012/0299282 A1* | 11/2012 | Holbein | .................. | B60R 22/03 |
| | | | | 280/806 |
| 2016/0304049 A1* | 10/2016 | Hayashi | .................. | B60R 22/20 |
| 2016/0304050 A1* | 10/2016 | Murasaki | ........... | A44B 11/2561 |
| 2017/0021796 A1* | 1/2017 | Hayashi | ............. | A44B 11/2561 |
| 2017/0225645 A1* | 8/2017 | Hayashi | .............. | B60R 22/1952 |
| 2018/0056931 A1* | 3/2018 | Tsujimoto | ............... | B60R 22/20 |

FOREIGN PATENT DOCUMENTS

| JP | 2002-106565 A | 4/2002 |
|---|---|---|
| JP | 2010-208497 A | 9/2010 |
| JP | 2012-131360 A | 7/2012 |

* cited by examiner

BUCKLE APPARATUS

CROSS-REFERENCE TO RELATED APPLICATION

This application claims priority under 35 USC 119 from Japanese Patent Application No. 2016-023930 filed Feb. 10, 2016, the disclosure of which is incorporated by reference herein.

BACKGROUND

Technical Field

The present invention relates to a buckle apparatus in which a buckle may be moved by movement of a moving member.

Related Art

There is a buckle apparatus (for example, see Japanese Patent Application Laid-Open (JP-A) No. 2010-208497) in which a moving member such as a movable nut or the like is provided inside a guide unit such as a frame or the like and a buckle is moved by the moving member being guided by the guide unit and moved.

In this kind of buckle apparatus, the moving member slides against an inside face of the guide unit. As a result, when the buckle is being moved, noise is produced by the movement of the moving member.

SUMMARY

In consideration of the circumstances described above, the present invention provides a buckle apparatus that may suppress the production of noise when a buckle is being moved.

A buckle apparatus according to a first aspect of the present invention includes: a buckle with which a tongue of a seatbelt apparatus is engageable; a moving member that, consequent to being moved, moves the buckle; a sliding member provided at the moving member, the sliding member moving together with the moving member; and a guide member that allows the sliding member to slide in accordance with movement of the moving member and guides the sliding member, friction between the guide member and the sliding member being less than friction between the guide member and the moving member.

In the first aspect, when the moving member is moved and the buckle is moved, the sliding member is moved together with the moving member, as a result of which the sliding member slides against the guide member. Thus, the sliding member is guided by the guide member.

Because friction between the sliding member and the guide member is lower than friction between the moving member and the guide member would be, the production of noise when the buckle is being moved may be suppressed.

In a buckle apparatus according to a second aspect of the present invention, in the first aspect, the sliding member is formed of a softer material than the guide member.

In the second aspect, because the sliding member is formed of a softer material than the guide member, the production of noise due to friction between the sliding member and the guide member when the buckle is being moved may be suppressed.

In a buckle apparatus according to a third aspect of the present invention, in the first aspect, the sliding member includes a resilient deformation portion that is resiliently deformable by a force from the guide member, the resilient deformation portion receiving the force from the guide member consequent to displacement of the sliding member toward the guide member.

In the third aspect, when the sliding member is displaced toward the guide member, the resilient deformation portion of the sliding member is subjected to a force from the guide member, as a result of which the resilient deformation portion resiliently deforms. In consequence, an impact that is caused by the sliding member abutting against the guide member as a result of the sliding member being displaced toward the guide member may be moderated.

In a buckle apparatus according to a fourth aspect of the present invention, the first aspect further includes: a friction reduction element provided between the sliding member and the guide member, the friction reduction element reducing friction between the sliding member and the guide member; and a retention portion provided at an abutting region of the sliding member against the guide member, the retention portion retaining the friction reduction element.

In the fourth aspect, the retention portion is provided at the abutting region between the sliding member and the guide member, and the friction reduction element is retained at the retention portion. Because the friction reduction element is provided between the sliding member and the guide member, friction between the sliding member and the guide member is reduced. As a result, the production of noise when the buckle is being moved may be suppressed effectively.

In a buckle apparatus according to a fifth aspect of the present invention, in the fourth aspect, an end at one side of the retention portion in a movement direction of the moving member opens out at an end at the one side of the sliding member in the movement direction of the moving member, and the end at the one side of the retention portion in the movement direction of the moving member has a greater dimension, in a direction orthogonal to both the movement direction of the moving member and a direction of opposition between the retention portion and the guide member, than a middle portion of the retention portion in the movement direction of the moving member.

In the fifth aspect, the end at the one side of the retention portion in the movement direction of the moving member opens out at the end at the one side of the sliding member in the movement direction of the moving member. In addition, the end at the one side of the retention portion in the movement direction of the moving member has a greater dimension, in the direction orthogonal to both the movement direction of the moving member and the direction of opposition between the retention portion and the guide member, than the middle portion of the retention portion in the movement direction of the moving member. As a result, when the moving member is being moved, the retention portion may collect a portion of the friction reduction element that has been applied to the guide member.

BRIEF DESCRIPTION OF THE DRAWINGS

Exemplary Embodiments of the present invention will be described in detail based on the following figures, wherein.

DETAILED DESCRIPTION

Figure 1:
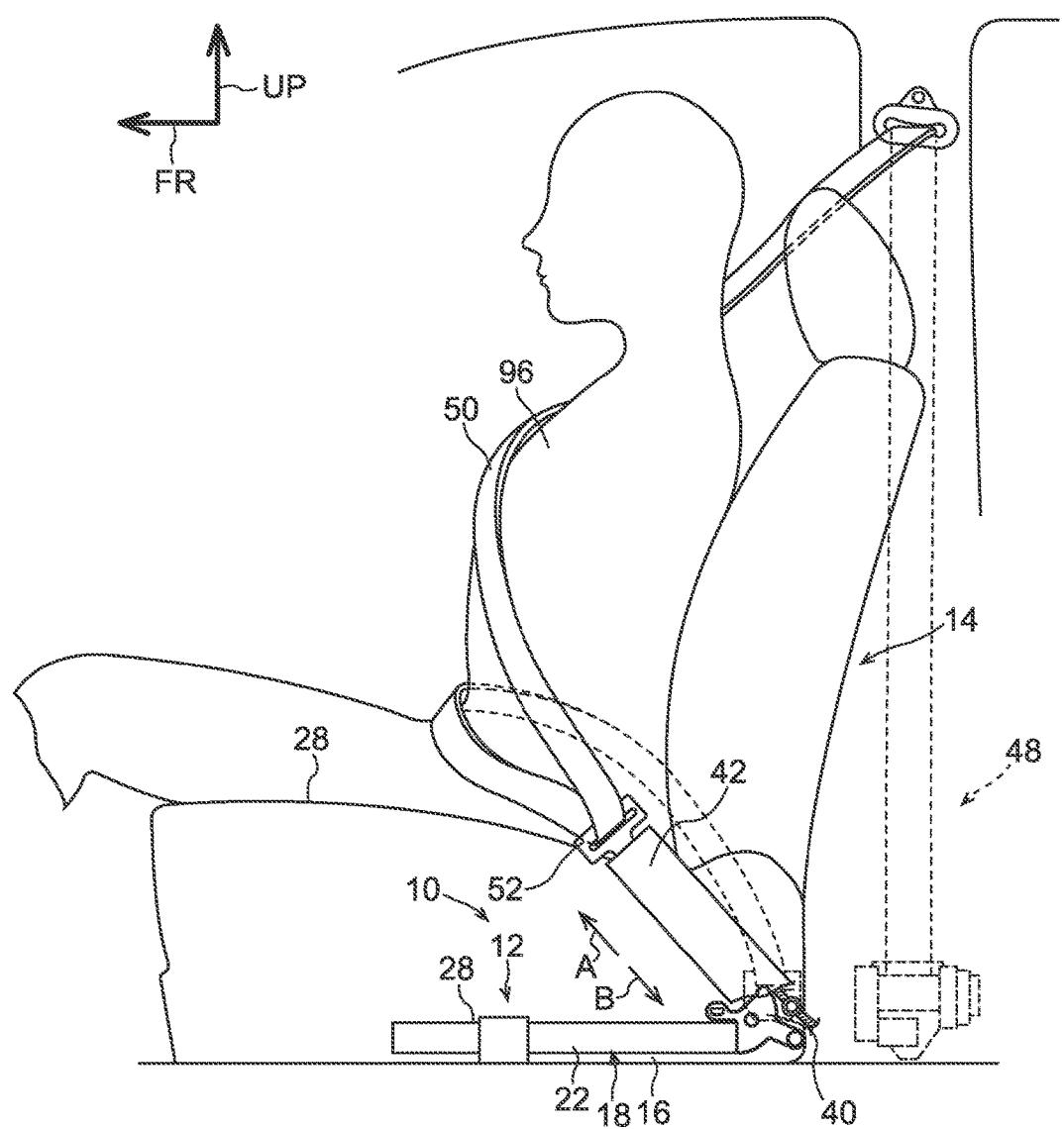
FIG. 1 is a side view, viewed from a vehicle width direction inner side, of a seat at which a buckle apparatus in accordance with a first exemplary embodiment is employed.

Exemplary Embodiments of the present invention are described in accordance with FIG. 1 to FIG. 6. The arrow FR in the drawings indicates the front side of a vehicle in which a main buckle apparatus 10 is employed, the arrow OUT indicates a vehicle width direction outer side, and the arrow UP indicates the vehicle upper side. In the following descriptions of each exemplary embodiment, portions that are basically the same as in an exemplary embodiment preceding the exemplary embodiment being described are assigned the same reference symbols and descriptions thereof may be omitted.

Structures of First Exemplary Embodiment

Figure 2:
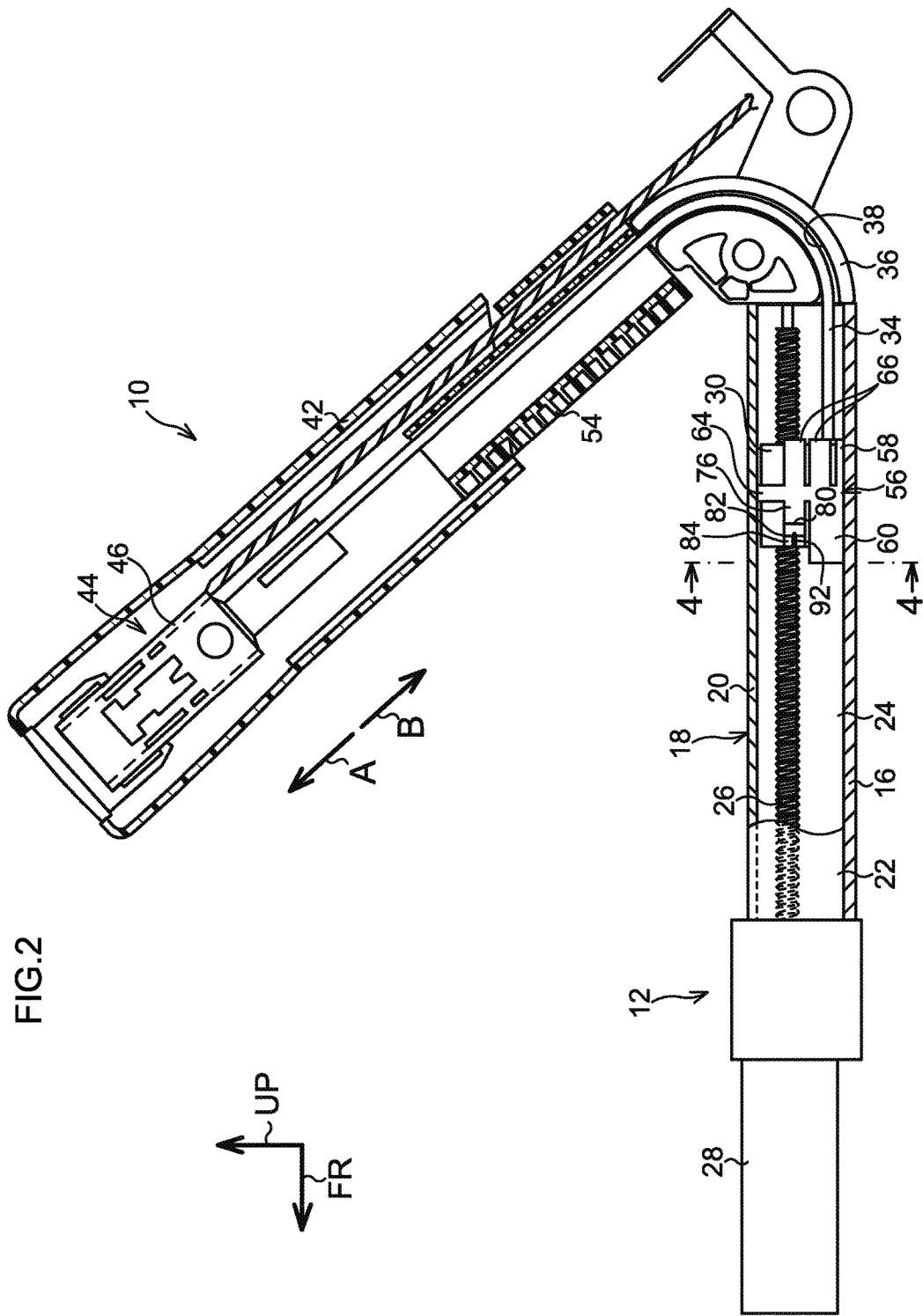
FIG. 2 is a side sectional view of the buckle apparatus in accordance with the first exemplary embodiment, which is a view in which a cover plate is removed.

As shown in FIG. 1 and FIG. 2, the main buckle apparatus 10 is equipped with a buckle-driving device 12 that serves as a driving unit. The buckle-driving device 12 is provided at the vehicle width direction inner side of a seat 14 at which the main buckle apparatus 10 is employed. The buckle-driving device 12 is equipped with a base plate 16, which is formed in a plate shape. A length direction of the base plate 16 is in the vehicle front-and-rear direction and a thickness direction of the base plate 16 is in the vehicle vertical direction. A frame 18 that serves as a guide member is provided at the vehicle upper side of the base plate 16. The frame 18 is formed of a metallic material such as iron, stainless steel or the like. The frame 18 is fixed to a vehicle body of the vehicle, such as a floor portion of the vehicle body or the like, by fasteners such as bolts or the like.

Figure 4:
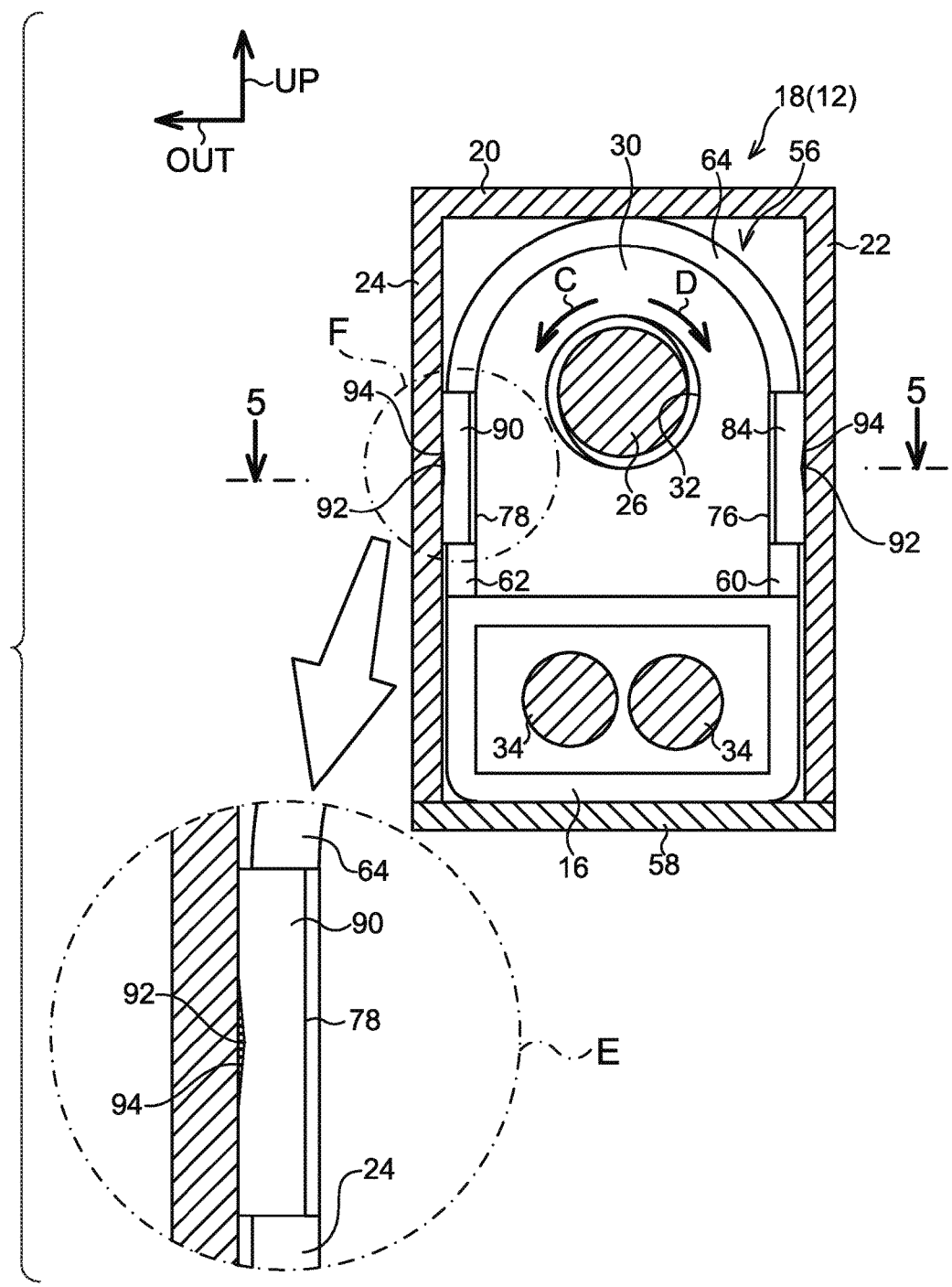
FIG. 4 is a sectional view cut along line 4-4 in FIG. 2, in which the single-dot chain line circle E is a magnified sectional view of the single-dot chain line circle F.

As shown in FIG. 4, the frame 18 is equipped with an upper wall 20, which is formed on a plate shape. A length direction of the upper wall 20 is in the vehicle front-and-rear direction and a thickness direction of the upper wall 20 is in the vehicle vertical direction. The upper wall 20 opposes the base plate 16 in the vehicle vertical direction. An inner side guide wall 22 projects to the vehicle lower side from the vehicle width direction inner side end of the upper wall 20. An outer side guide wall 24 projects to the vehicle lower side from the vehicle width direction outer side end of the upper wall 20.

The inner side guide wall 22 and the outer side guide wall 24 are formed in plate shapes. The length directions of the inner side guide wall 22 and the outer side guide wall 24 are in the vehicle front-and-rear direction, and the thickness directions of the inner side guide wall 22 and the outer side guide wall 24 are in the vehicle width direction. The inner side guide wall 22 and the outer side guide wall 24 oppose one another in the vehicle width direction. A drive screw 26 that serves as a driving component is provided between the inner side guide wall 22 and the outer side guide wall 24. A central axial direction of the drive screw 26 is in the vehicle front-and-rear direction. The drive screw 26 is rotatable about the central axis thereof.

As shown in FIG. 2, a motor actuator 28 that serves as a drive power output unit is provided at the vehicle front side of the frame 18. An end portion at the vehicle front side of the drive screw 26 is coupled to the motor actuator 28. The drive screw 26 is rotated about the central axis thereof by driving force that is output from a motor of the motor actuator 28. The motor of the motor actuator 28 is electronically connected to a control unit (not shown in the drawings) such as a motor driver, an electronic control unit (ECU) or the like. The motor of the motor actuator 28 is controlled by the control unit.

Figure 3:
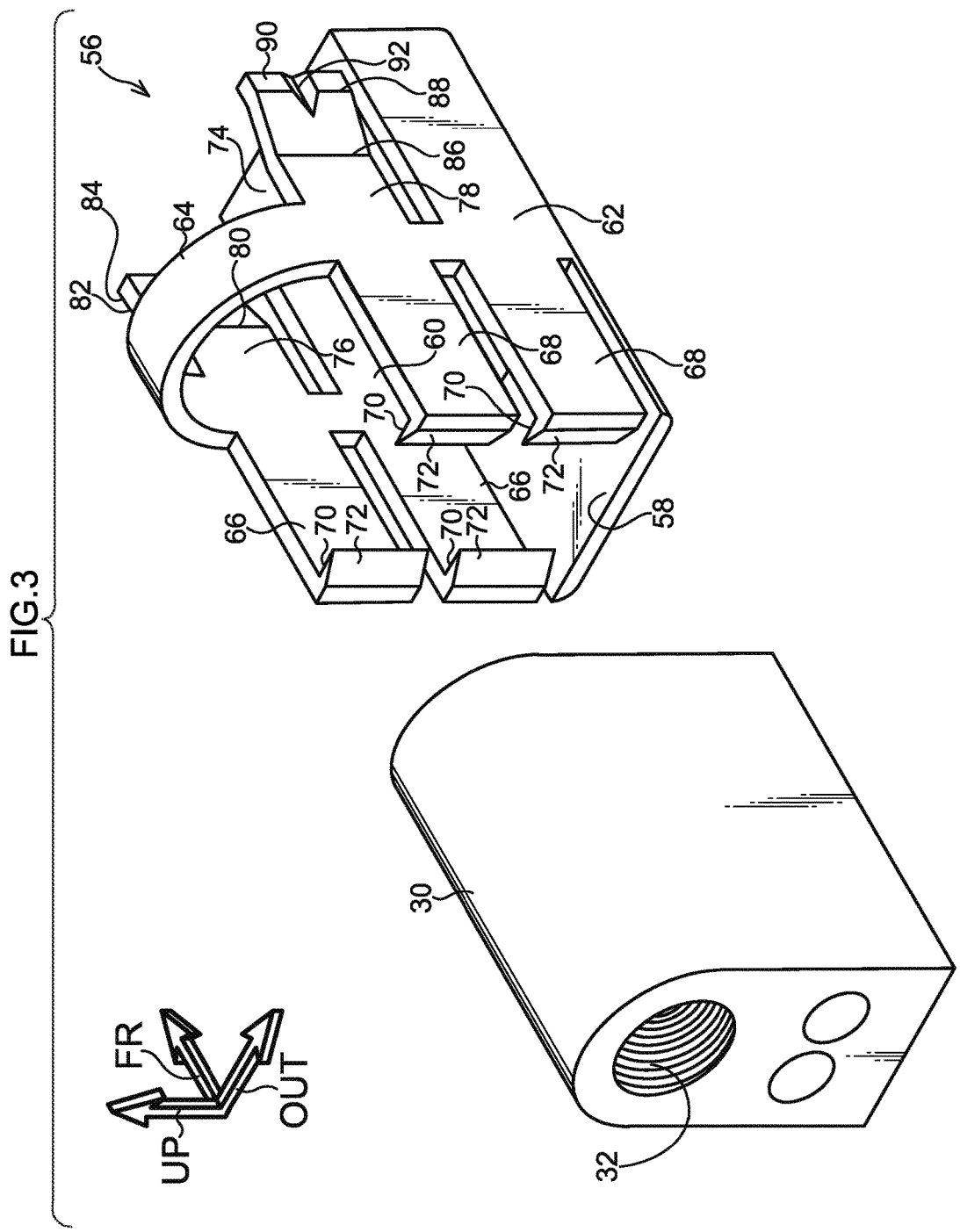
FIG. 3 is a perspective view of a slider and shoe of the buckle apparatus in accordance with the first exemplary embodiment.

As shown in FIG. 4, a slider 30 that serves as a moving member is provided between the inner side guide wall 22 and outer side guide wall 24 of the frame 18. The slider 30 is formed of a metal such as iron or the like. As shown in FIG. 3 and FIG. 4, of a cross-sectional shape of the slider 30 cut in a direction orthogonal to the vehicle front-and-rear direction, a portion at the vehicle lower side relative to a vehicle vertical direction middle portion of the slider 30 is formed in a rectangular shape and a portion at the vehicle upper side relative to the vehicle vertical direction middle portion of the slider 30 is formed in a semicircular shape.

A screw hole 32 is formed in the slider 30. The screw hole 32 penetrates through the slider 30 in the vehicle front-and-rear direction. The drive screw 26 (see FIG. 2) is disposed to penetrate through the screw hole 32. The drive screw 26 is engaged by threading with the screw hole 32. Thus, in a state in which rotation of the slider 30 about the central axis of the drive screw 26 is restricted, the slider 30 can be moved in the vehicle front-and-rear direction by the drive screw 26 being rotated.

As shown in FIG. 4, the main buckle apparatus 10 is further equipped with two wire ropes 34 that serve as coupling members. The wire ropes 34 are formed in long, narrow shapes and are provided next to one another in the vehicle width direction. As shown in FIG. 2, at a proximal end side of each wire rope 34 relative to a length direction middle portion thereof, the length direction of the wire rope 34 is in the vehicle front-and-rear direction. Length direction proximal end portions of the wire ropes 34 are coupled to the slider 30 at the vehicle lower side relative to the drive screw 26. Therefore, when the slider 30 moves in the vehicle front-and-rear direction, the wire ropes 34 are moved in the length direction thereof.

As shown in FIG. 2, a wire guide 36 is provided at the vehicle rear side of the frame 18. A wire guide channel 38 that serves as a channel portion is formed in the wire guide 36. The wire guide channel 38 opens out at a vehicle width direction inner side face of the wire guide 36 and is closed off from the vehicle width direction inner side by a cover plate 40 (see FIG. 1), which is provided at the vehicle width direction inner side of the wire guide 36.

One length direction end of the wire guide channel 38 opens out at a vehicle front side face of the wire guide 36. A length direction middle portion of the wire guide channel 38 curves in a circumferential direction around an axis whose axial direction is the vehicle width direction. The other length direction end of the wire guide channel 38 opens out at a vehicle upper side face of the wire guide 36. The wire ropes 34 pass through the wire guide channel 38. Thus, the wire ropes 34 follow the wire guide channel 38 of the wire guide 36 and are curved in the circumferential direction around the axis whose axial direction is the vehicle width direction (a width direction of the seat 14). The length direction distal end side of each wire rope 34 beyond the opening at the vehicle upper side face of the wire guide 36 extends diagonally to the vehicle upper-front side (the direction of arrow A in FIG. 2).

The main buckle apparatus 10 is further provided with a buckle cover 42. The buckle cover 42 is formed in a tubular shape whose length direction is a direction that is angled toward the vehicle front-and-rear direction relative to the vehicle vertical direction (i.e., the direction of arrow A and arrow B in FIG. 2). A buckle 44 is provided in a vehicle upper side region of the interior of the buckle cover 42. The buckle 44 is provided with a buckle body 46.

The buckle body 46 is formed in a "U" shape in cross section that opens out to the vehicle width direction outer side. Structural components of the buckle 44 such as a latch and the like (not shown in the drawings) are provided inside the buckle body 46. A tongue 52 is provided at a webbing 50 of a seatbelt apparatus 48, which is shown in FIG. 1. When the tongue 52 is inserted inside the buckle body 46 diagonally from the vehicle upper-front side of the buckle body 46, the latch provided in the buckle body 46 enters a hole portion formed in the tongue 52. Hence, the tongue 52 is anchored at the buckle 44.

As shown in FIG. 2, the main buckle apparatus 10 is equipped with a buckle guide 54. The buckle guide 54 is formed of a synthetic resin material that is softer than the buckle cover 42. The buckle guide 54 is formed in a tubular shape that is long in the length direction of the buckle cover 42 (the direction of arrow A and arrow B in FIG. 2). A region at the vehicle diagonal lower-rear side of the buckle cover 42 is coupled to the frame 18. The buckle guide 54 is inserted into the buckle cover 42 through an end portion at the vehicle diagonal lower-rear side of the buckle cover 42. Consequently, the buckle cover 42 is guided by the buckle guide 54 and may move diagonally to the vehicle upper-front side (in the direction of arrow A in FIG. 2) and diagonally to the vehicle lower-rear side (in the direction of arrow B in FIG. 2).

The wire ropes 34 pass through the inside of the buckle guide 54. The length direction distal end sides of the wire ropes 34 extend outside the buckle guide 54, through an end portion at the vehicle diagonal upper-front side of the buckle guide 54, and are coupled to the buckle body 46 provided in the buckle cover 42. Therefore, when length direction distal end portions of the wire ropes 34 are moved to the vehicle diagonal upper-front side (in the direction of arrow A in FIG. 2) by the wire ropes 34 being moved towards the length direction distal end sides thereof, the buckle 44 is moved to the vehicle diagonal upper-front side together with the buckle cover 42. On the other hand, when the length direction distal end portions of the wire ropes 34 are moved to the vehicle diagonal lower-rear side (in the direction of arrow B in FIG. 2) by the wire ropes 34 being moved towards the length direction proximal end sides thereof, the buckle 44 is moved to the vehicle diagonal lower-rear side together with the buckle cover 42.

Figure 5:
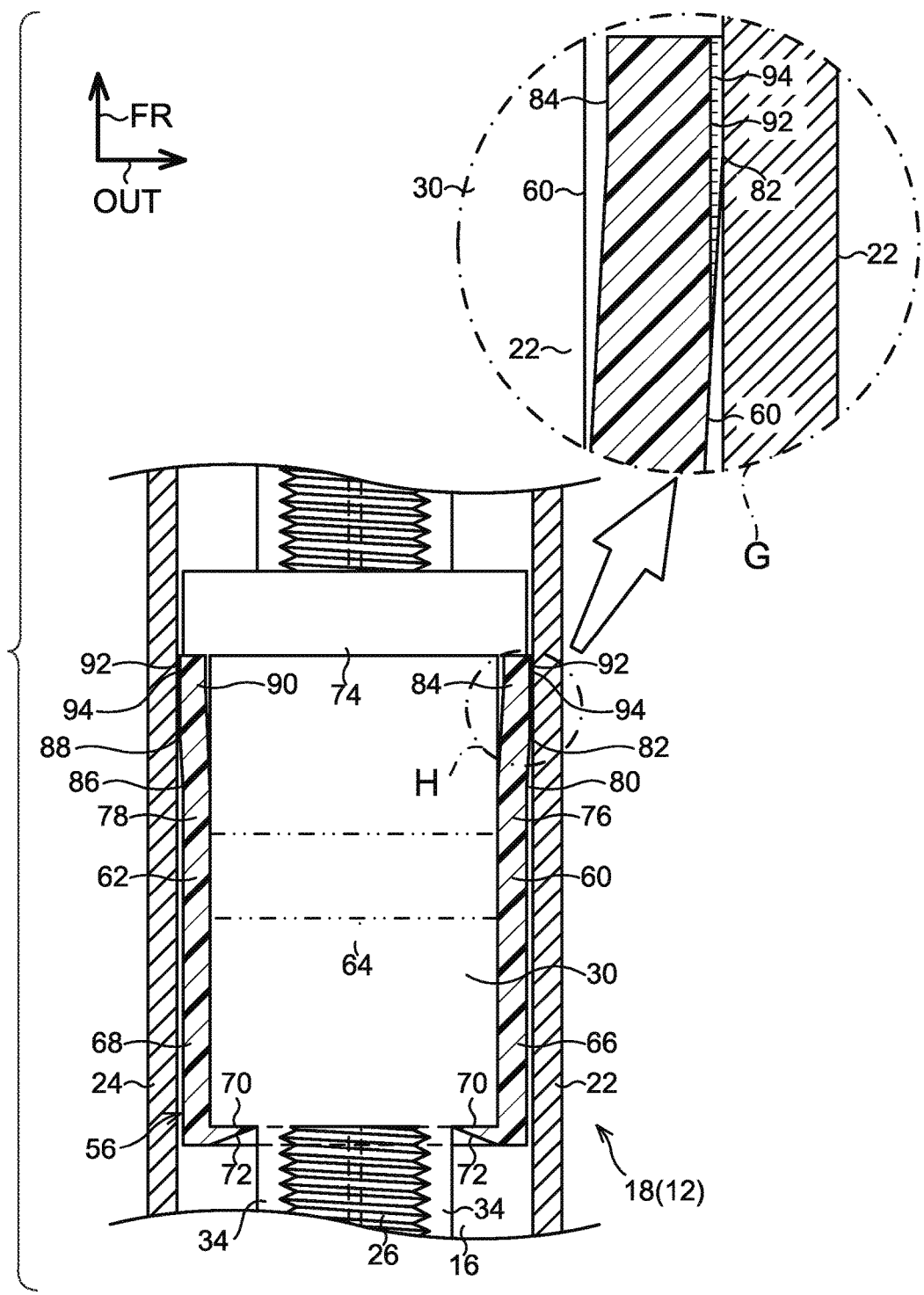
FIG. 5 is a sectional view cut along line 5-5 in FIG. 4, in which the single-dot chain line circle G is a magnified sectional view of the single-dot chain line circle H.

As shown in FIG. 2, the main buckle apparatus 10 is equipped with a shoe 56 that serves as a sliding member. The shoe 56 is formed of a synthetic resin material that is softer than both the slider 30 and the frame 18. As shown in FIG. 4 and FIG. 5, the shoe 56 is disposed between the inner side guide wall 22 and outer side guide wall 24 of the frame 18.

As shown in FIG. 3, the shoe 56 is provided with a base portion 58. The base portion 58 is formed in a plate shape. The slider 30 is disposed on the base portion 58. An inner side wall portion 60 and an outer side wall portion 62 are formed at the vehicle front side relative to a vehicle front-and-rear direction middle portion of the base portion 58. The inner side wall portion 60 stands toward the vehicle upper side from a vehicle width direction inner side end portion of the base portion 58 of the shoe 56, and the outer side wall portion 62 stands toward the vehicle upper side from a vehicle width direction outer side end portion of the base portion 58 of the shoe 56.

A spacing between a vehicle width direction inner side face of the inner side wall portion 60 and a vehicle width direction outer side face of the outer side wall portion 62, and a vehicle width direction dimension of the base portion 58 of the shoe 56, are made slightly smaller than a spacing between a vehicle width direction outer side face of the inner side guide wall 22 of the frame 18 and a vehicle width direction inner side face of the outer side guide wall 24. Therefore, as shown in FIG. 4 and FIG. 5, in the state in which the shoe 56 is disposed between the inner side guide wall 22 and outer side guide wall 24 of the frame 18, gaps are formed between the shoe 56 and the frame 18.

As shown in FIG. 3, an arch portion 64 is formed at the vehicle upper side of the inner side wall portion 60 and outer side wall portion 62 of the shoe 56. The arch portion 64 is formed in a semicircular shape that curves along a vehicle upper side face of the slider 30. The vehicle width direction inner side end of the arch portion 64 connects with the vehicle upper side end of the inner side wall portion 60 of the shoe 56, and the vehicle width direction outer side end of the arch portion 64 connects with the vehicle upper side end of the outer side wall portion 62 of the shoe 56. As shown in FIG. 4, the vehicle upper side face of the slider 30 disposed on the base portion 58 of the shoe 56 abuts against the arch portion 64. As a result, relative displacement of the slider 30 to the vehicle upper side with respect to the shoe 56 is suppressed.

As shown in FIG. 3, inner side retention pieces 66 project to the vehicle rear side from the vehicle rear side end of the inner side wall portion 60 of the shoe 56, and outer side retention pieces 68 project to the vehicle rear side from the vehicle rear side end of the outer side wall portion 62 of the shoe 56. Retention pawls 70 are formed at vehicle rear side end portions of the inner side retention pieces 66 and the outer side retention pieces 68. The retention pawl 70 of each inner side retention piece 66 projects to the vehicle width direction outer side from the vehicle rear side end portion of the inner side retention piece 66, and the retention pawl 70 of each outer side retention piece 68 projects to the vehicle width direction inner side from the vehicle rear side end portion of the outer side retention piece 68. As shown in FIG. 5, the retention pawls 70 of the inner side retention pieces 66 and outer side retention pieces 68 abut against a vehicle rear side face of the slider 30 disposed on the base portion 58 of the shoe 56. As a result, relative displacement of the slider 30 to the vehicle rear side with respect to the shoe 56 is suppressed.

Vehicle rear side faces of the retention pawls 70 of the inner side retention pieces 66 and outer side retention pieces 68 serve as load-receiving surfaces 72. When a load is applied to the load-receiving surfaces 72 of the retention pawls 70 of the inner side retention pieces 66 from the vehicle rear side, the inner side retention pieces 66 resiliently deform to the vehicle width direction inner side. Correspondingly, when a load is applied to the load-receiving surfaces 72 of the retention pawls 70 of the outer side retention pieces 68 from the vehicle rear side, the outer side retention pieces 68 resiliently deform to the vehicle width direction outer side.

When the slider 30 is to be assembled to the shoe 56, the slider 30 is brought close to the shoe 56 from the vehicle rear side of the shoe 56, and the load-receiving surfaces 72 of the retention pawls 70 of the inner side retention pieces 66 and outer side retention pieces 68 of the shoe 56 are pressed from the vehicle rear side by the slider 30. Consequently, the inner side retention pieces 66 and outer side retention pieces 68 of the shoe 56 are resiliently deformed to the vehicle width direction sides thereof, as a result of which the slider 30 can pass between the retention pawls 70 of the inner side retention pieces 66 and the retention pawls 70 of the outer side retention pieces 68, and the slider 30 can be disposed on the base portion 58 of the shoe 56.

As shown in FIG. 3 and FIG. 5, the shoe 56 is also provided with a front side abutting portion 74. The front side abutting portion 74 is formed at the vehicle front side of the shoe 56 relative to the arch portion 64, and is disposed at the vehicle upper side of the base portion 58 of the shoe 56. A vehicle width direction inner side end of the front side abutting portion 74 connects with a vehicle front side end of the inner side wall portion 60 of the shoe 56, and a vehicle width direction outer side end of the front side abutting portion 74 connects with a vehicle front side end of the outer side wall portion 62 of the shoe 56. A vehicle rear side end of the front side abutting portion 74 of the shoe 56 abuts against a vehicle front side face of the slider 30 disposed on the base portion 58 of the shoe 56. As a result, relative displacement of the slider 30 to the vehicle front side with respect to the shoe 56 is suppressed.

As is also shown in FIG. 3 and FIG. 5, an inner side spring piece 76 and an outer side spring piece 78 are provided at the vehicle upper side of the shoe 56 relative to the front side abutting portion 74. The inner side spring piece 76 and outer side spring piece 78 serve as a resilient deformation portion. The inner side spring piece 76 projects to the vehicle front side from the inner side wall portion 60 of the shoe 56. An inner side first inflection portion 80 is formed at a vehicle front-and-rear direction middle portion of the inner side spring piece 76; the inner side spring piece 76 is inflected toward the vehicle width direction inner side at the inner side first inflection portion 80. The inner side spring piece 76, between the vehicle rear side end of the inner side spring piece 76 and the inner side first inflection portion 80, abuts against a vehicle width direction inner side face of the slider 30 disposed on the base portion 58 of the shoe 56.

An inner side second inflection portion 82 is formed at the vehicle front side of the inner side spring piece 76 relative to the inner side first inflection portion 80. The inner side spring piece 76 is inflected toward the vehicle front side at the inner side second inflection portion 82. A vehicle front side region of the inner side spring piece 76 relative to the inner side second inflection portion 82 serves as an inner side sliding portion 84.

Correspondingly, the outer side spring piece 78 projects to the vehicle front side from the outer side wall portion 62 of the shoe 56. As shown in FIG. 5, an outer side first inflection portion 86 is formed at a vehicle front-and-rear direction middle portion of the outer side spring piece 78; the outer side spring piece 78 is inflected toward the vehicle width direction outer side at the outer side first inflection portion 86. The outer side spring piece 78, between the vehicle rear side end of the outer side spring piece 78 and the outer side first inflection portion 86, abuts against a vehicle width direction outer side face of the slider 30 disposed on the base portion 58 of the shoe 56.

An outer side second inflection portion 88 is formed at the vehicle front side of the outer side spring piece 78 relative to the outer side first inflection portion 86. The outer side spring piece 78 is inflected toward the vehicle front side at the outer side second inflection portion 88. A vehicle front side region of the outer side spring piece 78 relative to the outer side second inflection portion 88 serves as an outer side sliding portion 90.

In a state in which no load in the vehicle width direction is applied to either of the inner side spring piece 76 and the outer side spring piece 78, a spacing between a vehicle width direction inner side face of the inner side sliding portion 84 of the inner side spring piece 76 of the shoe 56 and a vehicle width direction outer side face of the outer side sliding portion 90 of the outer side spring piece 78 is equal to or greater than the spacing between the vehicle width direction outer side face of the inner side guide wall 22 of the frame 18 and the vehicle width direction inner side face of the outer side guide wall 24 of the frame 18 (in other words, a width dimension of the inside of the frame 18). Therefore, when the shoe 56 is disposed between the inner side guide wall 22 and outer side guide wall 24 of the frame 18, at least one of the inner side spring piece 76 and the outer side spring piece 78 is resiliently deformed to the inner side in the direction of opposition between the inner side guide wall 22 and the outer side guide wall 24.

The material of the shoe 56, roughness of the vehicle width direction inner side face of the inner side sliding portion 84 of the inner side spring piece 76 of the shoe 56, and suchlike are specified such that friction between the vehicle width direction inner side face of the inner side sliding portion 84 of the inner side spring piece 76 of the shoe 56 and the vehicle width direction outer side face of the inner side guide wall 22 of the frame 18 is less than friction that would occur between the vehicle width direction inner side face of the slider 30 and the vehicle width direction outer side face of the inner side guide wall 22 if the slider 30 were moved in a state in which the vehicle width direction inner side face of the slider 30 was abutted against the vehicle width direction outer side face of the inner side guide wall 22.

Moreover, the material of the shoe 56, roughness of the vehicle width direction outer side face of the outer side sliding portion 90 of the outer side spring piece 78 of the shoe 56, and suchlike are specified such that friction between the vehicle width direction outer side face of the outer side sliding portion 90 of the outer side spring piece 78 of the shoe 56 and the vehicle width direction inner side face of the outer side guide wall 24 of the frame 18 is less than friction that would occur between the vehicle width direction outer side face of the slider 30 and the vehicle width direction inner side face of the outer side guide wall 24 if the slider 30 were moved in a state in which the vehicle width direction outer side face of the slider 30 was abutted against the vehicle width direction inner side face of the outer side guide wall 24.

As shown in FIG. 4 and FIG. 5, a grease retainer 92 is formed at each of the inner side sliding portion 84 of the inner side spring piece 76 and the outer side sliding portion 90 of the outer side spring piece 78 of the shoe 56. The grease retainers 92 serve as a retention portion. The grease retainer 92 at the inner side sliding portion 84 of the inner side spring piece 76 is formed as a groove that is long in the vehicle front-and-rear direction, which is formed at the vehicle width direction inner side face of the inner side sliding portion 84. The grease retainer 92 of the inner side sliding portion 84 opens out at both the vehicle front side end and the vehicle rear side end of the inner side sliding portion 84 of the inner side spring piece 76. Grease 94 is provided in the grease retainer 92 of the inner side sliding portion 84 of the inner side spring piece 76. The grease 94 serves as a lubricant and constitutes a friction reduction element.

Meanwhile, the grease retainer 92 at the outer side sliding portion 90 of the outer side spring piece 78 of the shoe 56 is formed as a groove that is long in the vehicle front-and-rear direction, which is formed at the vehicle width direction outer side face of the outer side sliding portion 90. The grease retainer 92 of the outer side sliding portion 90 opens out at both the vehicle front side end and the vehicle rear side end of the outer side sliding portion 90 of the outer side spring piece 78. The grease 94 is provided in the grease retainer 92 of the outer side sliding portion 90 of the outer side spring piece 78. The grease 94 is applied not just to the grease retainers 92 but also to the vehicle width direction inner side face of the inner side sliding portion 84 of the inner side spring piece 76 of the shoe 56, the vehicle width direction outer side face of the inner side guide wall 22 of the frame 18, the vehicle width direction outer side face of the outer side sliding portion 90 of the outer side spring piece 78 of the shoe 56, the vehicle width direction inner side face of the outer side guide wall 24 of the frame 18, and suchlike.

Operation and Effects of the First Exemplary Embodiment

With the main buckle apparatus 10, when, for example, a door of the vehicle that corresponds with the seat 14 at which the main buckle apparatus 10 is employed transitions from being closed to being open, this change in the open/closed state of the door is detected by a detection unit such as a door opening and closing detection unit or the like, which is a curtain switch or the like. Further, when, for example, a vehicle occupant 96 sits on the seat 14, the sitting of the vehicle occupant 96 on the seat 14 is detected by a detection unit such as a vehicle occupant detection unit or the like, which is a load sensor provided in the seat 14 or the like. In association with a vehicle occupant boarding the vehicle thus, the level of electronic signals outputted to the control unit from a detection unit is switched in response to the change in state of the door, the seat 14 or the like. Hence, the motor actuator 28 is driven and the drive screw 26 is rotated, and the slider 30 acts to rotate together with the drive screw 26.

The slider 30 is provided in the shoe 56 and relative displacement of the slider 30 with respect to the shoe 56 is restricted. Therefore, when the slider 30 acts to rotate together with the drive screw 26, the shoe 56 acts to turn together with the slider 30. However, the inner side sliding portion 84 of the inner side spring piece 76 of the shoe 56 abuts against the inner side guide wall 22 of the frame 18, and the outer side sliding portion 90 of the outer side spring piece 78 of the shoe 56 abuts against the outer side guide wall 24 of the frame 18. Therefore, turning of the shoe 56 is restricted, and hence turning of the slider 30 is restricted. Therefore, when the motor actuator 28 is driven and the drive screw 26 is rotated, the slider 30 slides to the vehicle rear side together with the shoe 56. Accordingly, when the wire ropes 34 are moved to the length direction distal end side thereof, the buckle body 46 is pushed to the vehicle diagonal upper-front side by the wire ropes 34.

When pushing force from the wire ropes 34 is transmitted through the buckle body 46 to the buckle cover 42, as shown in FIG. 2, the buckle cover 42 moves to the vehicle diagonal upper-front side (the direction of arrow A in FIG. 2), guided by the buckle guide 54. As a result of this movement of the buckle cover 42, the vehicle occupant 96 may easily engage the tongue 52 with the buckle 44 and may easily put on the webbing 50.

When the tongue 52 is engaged with the buckle 44, the level of electronic signals outputted from a buckle switch of the buckle 44 to the control unit is switched. Hence, the motor actuator 28 is driven and the drive screw 26 is rotated, and the slider 30 slides to the vehicle front side together with the shoe 56. As a result, the wire ropes 34 are moved toward the length direction proximal end side thereof, and the buckle cover 42 is pulled by the wire ropes 34 via the buckle body 46. Accordingly, the buckle cover 42 is guided by the buckle guide 54 and, as shown in FIG. 1, the buckle cover 42 moves to the vehicle diagonal lower-rear side (the direction of arrow B in FIG. 1).

This shoe 56 is formed of a synthetic resin material that is softer than the slider 30 and the frame 18. Furthermore, friction between the vehicle width direction inner side face of the inner side sliding portion 84 of the inner side spring piece 76 of the shoe 56 and the vehicle width direction outer side face of the inner side guide wall 22 of the frame 18 is smaller than friction that would occur between the vehicle width direction inner side face of the slider 30 and the vehicle width direction outer side face of the inner side guide wall 22 if the slider 30 were moved in a state in which the vehicle width direction inner side face of the slider 30 was abutted against the vehicle width direction outer side face of the inner side guide wall 22.

Moreover, friction between the vehicle width direction outer side face of the outer side sliding portion 90 of the outer side spring piece 78 of the shoe 56 and the vehicle width direction inner side face of the outer side guide wall 24 of the frame 18 is smaller than friction that would occur between the vehicle width direction outer side face of the slider 30 and the vehicle width direction inner side face of the outer side guide wall 24 if the slider 30 were moved in a state in which the vehicle width direction outer side face of the slider 30 was abutted against the vehicle width direction inner side face of the outer side guide wall 24. Therefore, the production of noise when the buckle 44 is being moved may be suppressed compared to a structure in which the slider 30 is moved in the vehicle front-and-rear direction in a state in which the slider 30 is abutted against the frame 18.

Further, the grease 94 is provided in the respective grease retainers 92 at the inner side sliding portion 84 of the inner side spring piece 76 and the outer side sliding portion 90 of the outer side spring piece 78 of the shoe 56. The grease 94 is also applied to the vehicle width direction inner side face of the inner side sliding portion 84 of the inner side spring piece 76 of the shoe 56, the vehicle width direction outer side face of the inner side guide wall 22 of the frame 18, the vehicle width direction outer side face of the outer side sliding portion 90 of the outer side spring piece 78 of the shoe 56, the vehicle width direction inner side face of the outer side guide wall 24 of the frame 18, and suchlike. Because of this grease 94, friction between the vehicle width direction inner side face of the inner side sliding portion 84 of the inner side spring piece 76 of the shoe 56 and the vehicle width direction outer side face of the inner side guide wall 22 of the frame 18 and friction between the vehicle width direction outer side face of the outer side sliding portion 90 of the outer side spring piece 78 of the shoe 56 and the vehicle width direction inner side face of the outer side guide wall 24 of the frame 18 is reduced. Therefore, the shoe 56 may be moved smoothly in the vehicle front-andrear direction, and the production of noise when the buckle 44 is being moved may be suppressed effectively.

The grease retainers 92 are formed at each of the inner side sliding portion 84 of the inner side spring piece 76 and the outer side sliding portion 90 of the outer side spring piece 78 of the shoe 56, and the grease 94 is provided in the grease retainers 92. Therefore, the grease 94 may be retained over comparatively long periods between, of the shoe 56, the inner side sliding portion 84 of the inner side spring piece 76 and the outer side sliding portion 90 of the outer side spring piece 78 and, of the frame 18, the inner side guide wall 22 and the outer side guide wall 24. Consequently, smooth movement of the shoe 56 in the vehicle front-and-rear direction and suppression of the production of noise when the buckle 44 is being moved may be maintained over comparatively long periods.

The spacing of the shoe 56 between the vehicle width direction inner side face of the inner side wall portion 60 and the vehicle width direction outer side face of the outer side wall portion 62 and the vehicle width direction dimension of the base portion 58 of the shoe 56 are set slightly smaller than the spacing of the frame 18 between the vehicle width direction outer side face of the inner side guide wall 22 and the vehicle width direction inner side face of the outer side guide wall 24. Consequently, the shoe 56 may be disposed inside the frame 18 with ease.

Furthermore, because the spacing of the shoe 56 between the vehicle width direction inner side face of the inner side wall portion 60 and the vehicle width direction outer side face of the outer side wall portion 62 and the vehicle width direction dimension of the base portion 58 of the shoe 56 are set slightly smaller than the spacing of the frame 18 between the vehicle width direction outer side face of the inner side guide wall 22 and the vehicle width direction inner side face of the outer side guide wall 24, in the state in which the shoe 56 is disposed inside the frame 18, gaps are formed between the inner side wall portion 60 of the shoe 56 and the inner side guide wall 22 of the frame 18 and between the outer side wall portion 62 of the shoe 56 and the outer side guide wall 24 of the frame 18.

Therefore, for example, when the drive screw 26 rotates in the direction of arrow C in FIG. 4, the shoe 56 acts to turn in the direction of arrow C in FIG. 4 about the central axis of the drive screw 26 together with the slider 30, and the inner side wall portion 60 of the shoe 56 moves closer to the inner side guide wall 22 of the frame 18.

In the present exemplary embodiment, in the state in which the shoe 56 is disposed inside the frame 18, the inner side sliding portion 84 of the inner side spring piece 76 of the shoe 56 abuts against the inner side guide wall 22 of the frame 18. Therefore, when the shoe 56 turns in the direction of arrow C in FIG. 4, the inner side sliding portion 84 of the inner side spring piece 76 of the shoe 56 receives a pressing reaction force from the inner side guide wall 22 of the frame 18, as a result of which the inner side spring piece 76 of the shoe 56 resiliently deforms. Consequently, an impact that occurs when the inner side wall portion 60 of the shoe 56 is abutted against the inner side guide wall 22 of the frame 18 by turning of the shoe 56 may be moderated, and the production of noise by this impact may be suppressed.

Alternatively, when the shoe 56 is turned in the direction of arrow D in FIG. 4 by the drive screw 26 rotating in the direction of arrow D in FIG. 4, the outer side wall portion 62 of the shoe 56 is abutted against the outer side guide wall 24 of the frame 18. However, an impact at this time may be moderated by resilient deformation of the outer side spring piece 78 of the shoe 56, and the production of noise by this impact may be suppressed.

Second Exemplary Embodiment

Now, a second exemplary embodiment is described.

Figure 6:
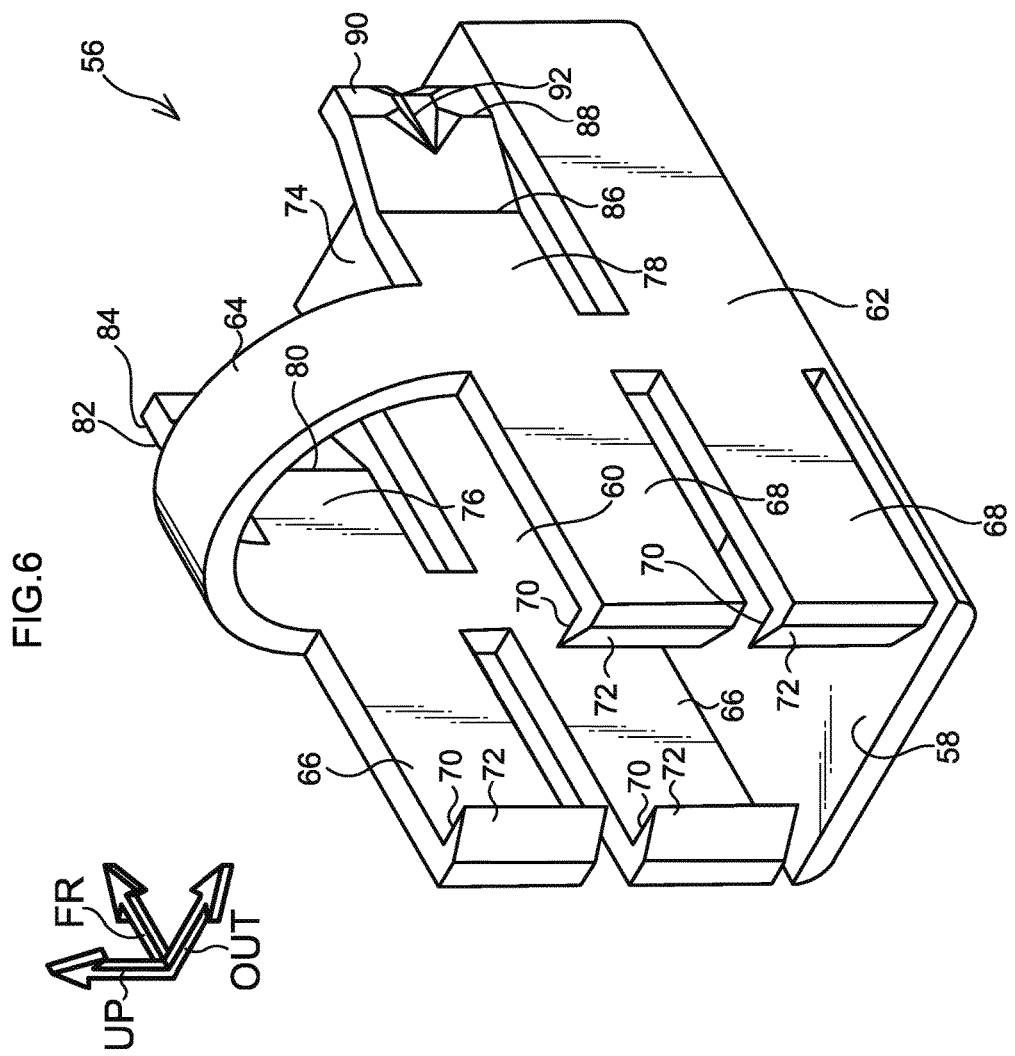
FIG. 6 is a perspective view of a shoe of a buckle apparatus in accordance with a second exemplary embodiment.

As shown in FIG. 6, in the present exemplary embodiment, the grease retainer 92 at the inner side sliding portion 84 of the inner side spring piece 76 of the shoe 56 has a larger vehicle vertical direction dimension at both vehicle front-and-rear direction sides thereof than at a vehicle front-and-rear direction middle portion thereof. Although not shown in the drawing, similarly to the grease retainer 92 at the inner side sliding portion 84 of the inner side spring piece 76, the grease retainer 92 at the outer side sliding portion 90 of the outer side spring piece 78 of the shoe 56 also has a larger vehicle vertical direction dimension at both the vehicle front-and-rear direction sides thereof than at the vehicle front-and-rear direction middle portion thereof.

In this structure, ranges of opposition in the vehicle vertical direction between the grease retainers 92 of the shoe 56 and the inner side guide wall 22 and outer side guide wall 24 of the frame 18 are larger at the vehicle front side ends and the vehicle rear side ends of the grease retainers 92 than at the vehicle front-and-rear direction middle portions of the grease retainers 92. Thus, when the shoe 56 slides in the vehicle front-and-rear direction, the grease 94 applied to the vehicle width direction outer side face of the inner side guide wall 22 and the vehicle width direction inner side face of the outer side guide wall 24 of the frame 18 is accumulated into the grease retainers 92 through the shoe 56 movement direction leading ends (the vehicle front side ends or the vehicle rear side ends) of the grease retainers 92 of the shoe 56.

In the present exemplary embodiment, because the ranges of opposition in the vehicle vertical direction between the grease retainers 92 of the shoe 56 and the inner side guide wall 22 and outer side guide wall 24 of the frame 18 are larger at the vehicle front side ends and vehicle rear side ends of the grease retainers 92 than at the vehicle front-and-rear direction middle portions of the grease retainers 92, when the shoe 56 is slid in the vehicle front-and-rear direction, the grease 94 applied to the inner side guide wall 22 and outer side guide wall 24 of the frame 18 may be collected into the grease retainers 92 from larger ranges in the vehicle vertical direction. Therefore, the grease 94 may be retained at the grease retainers 92 of the shoe 56 over long periods. Thus, effects provided by the formation of the grease retainers 92 at the shoe 56 may be maintained over long periods.

Structures of the present exemplary embodiment are basically the same as in the first exemplary embodiment apart from both the vehicle front-and-rear direction sides of each grease retainer 92 of the shoe 56 having larger vehicle vertical direction dimensions than the vehicle front-and-rear direction middle portion of the grease retainer 92. Therefore, the present exemplary embodiment may provide the same effects as the first exemplary embodiment.

Each of the exemplary embodiments described above has a structure in which the shoe 56 is formed of a synthetic resin material that is softer than the frame 18 and the slider 30. However, it is sufficient to form a structure such that friction of abutting regions between the shoe 56 and the frame 18 is smaller than friction that would occur in the event of the slider 30 being moved in a state in which the slider 30 was abutted against the frame 18. Therefore, for example, the shoe 56 may be formed of metal; the material constituting the shoe 56 is not particularly limited.

In the exemplary embodiments described above, numbers of the grease retainers 92 formed in each of the inner side sliding portion 84 of the inner side spring piece 76 and outer side sliding portion 90 of the outer side spring piece 78 of the shoe 56 are specifically recited. However, the numbers of the grease retainers 92 formed in each of the inner side sliding portion 84 of the inner side spring piece 76 and outer side sliding portion 90 of the outer side spring piece 78 of the shoe 56 may be ones and may be plural numbers.

The exemplary embodiments described above have structures in which the grease retainers 92 are formed in the inner side sliding portion 84 of the inner side spring piece 76 and the outer side sliding portion 90 of the outer side spring piece 78 of the shoe 56. However, one portion or more of the vehicle upper side face of the arch portion 64 of the shoe 56 may be formed as a flat surface, this flat region of the vehicle upper side face of the arch portion 64 of the shoe 56 may be abutted against the upper wall 20 of the frame 18, and a grease retainer may be formed in the flat region of the vehicle upper side face of the arch portion 64 of the shoe 56. Thus, grease retainers may be formed as appropriate in regions of the shoe 56 that abut against the frame 18 or a member other than the frame 18.

What is claimed is:

1. A buckle apparatus comprising:
   a buckle with which a tongue of a seatbelt apparatus is engageable;
   a moving member that, consequent to being moved, moves the buckle;
   a sliding member provided at the moving member, the sliding member moving together with the moving member;
   a guide member that allows the sliding member to slide in accordance with movement of the moving member and guides the sliding member, friction between the guide member and the sliding member being less than friction between the guide member and the moving member, and
   a resilient deformation portion that is provided at both sides of the sliding member, that projects from the sliding member in a movement direction of the moving member, and that is resiliently deformable by a projecting direction distal end portion of the resilient deformation portion abutting against the guide member, and by the resilient deformation portion receiving a force from the guide member consequent to the displacement of the sliding member toward the guide member.

2. The buckle apparatus according to claim 1, wherein the sliding member is formed of a softer material than the guide member.

3. The buckle apparatus according to claim 1, further comprising:
   a friction reduction element provided between the sliding member and the guide member, the friction reduction element reducing the friction between the sliding member and the guide member; and
   a retention portion provided at an abutting region of the sliding member against the guide member, the retention portion retaining the friction reduction element.

4. The buckle apparatus according to claim 3, wherein an end at one side of the retention portion in a movement direction of the moving member opens out at an end at one side of the sliding member in the movement direction of the moving member, and the end at the one side of the retention portion in the movement direction of the moving member has a greater dimension, in a direction orthogonal to both the movement direction of the moving member and a direction of opposition between the retention portion and the guide member, than a middle portion of the retention portion in the movement direction of the moving member.

5. A buckle apparatus comprising:
   a buckle with which a tongue of a seatbelt apparatus is engageable;
   a moving member that, consequent to being moved, moves the buckle;
   a sliding member provided at the moving member, the sliding member moving together with the moving member;
   a guide member that allows the sliding member to slide in accordance with movement of the moving member and guides the sliding member, friction between the guide member and the sliding member being less than friction between the guide member and the moving member;
   a friction reduction element provided between the sliding member and the guide member, the friction reduction element reducing the friction between the sliding member and the guide member, and
   a retention portion provided at an abutting region of the sliding member against the guide member, the retention portion retaining the friction reduction element.

6. The buckle apparatus according to claim 5, wherein the sliding member is formed of a softer material than the guide member.

7. The buckle apparatus according to claim 5, wherein a resilient deformation portion is provided at both sides of the sliding member, that projects from the sliding member in a movement direction of the moving member, and that is resiliently deformable by a projecting direction distal end portion of the resilient deformation portion abutting against the guide member, and by the resilient deformation portion receiving the force from the guide member consequent to the displacement of the sliding member toward the guide member.

8. The buckle apparatus according to claim 5, wherein an end at one side of the retention portion in a movement direction of the moving member opens out at an end at one side of the sliding member in the movement direction of the moving member, and the end at the one side of the retention portion in the movement direction of the moving member has a greater dimension, in a direction orthogonal to both the movement direction of the moving member and a direction of opposition between the retention portion and the guide member, than a middle portion of the retention portion in the movement direction of the moving member.

* * * * *